UNITED STATES PATENT OFFICE.

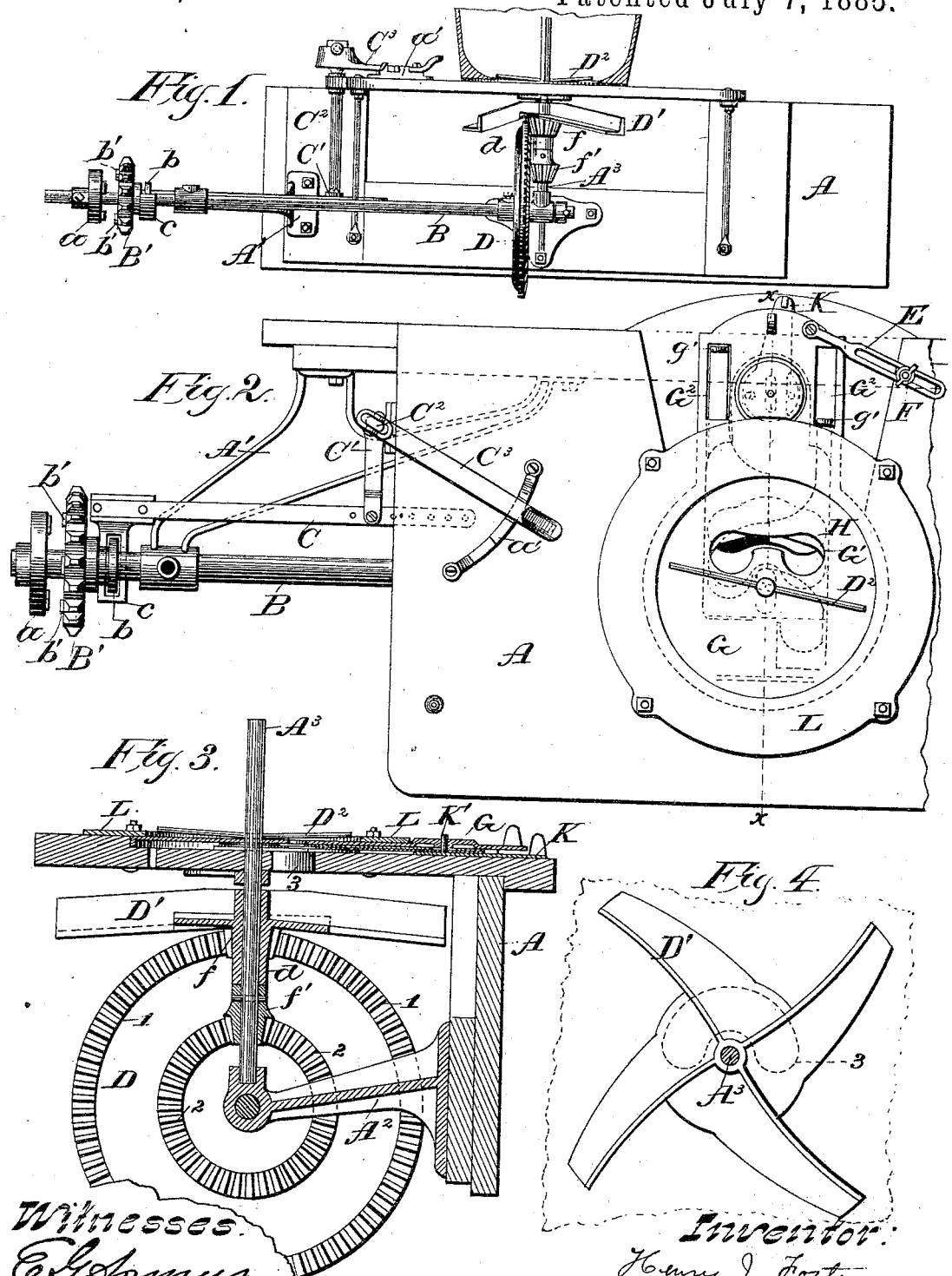

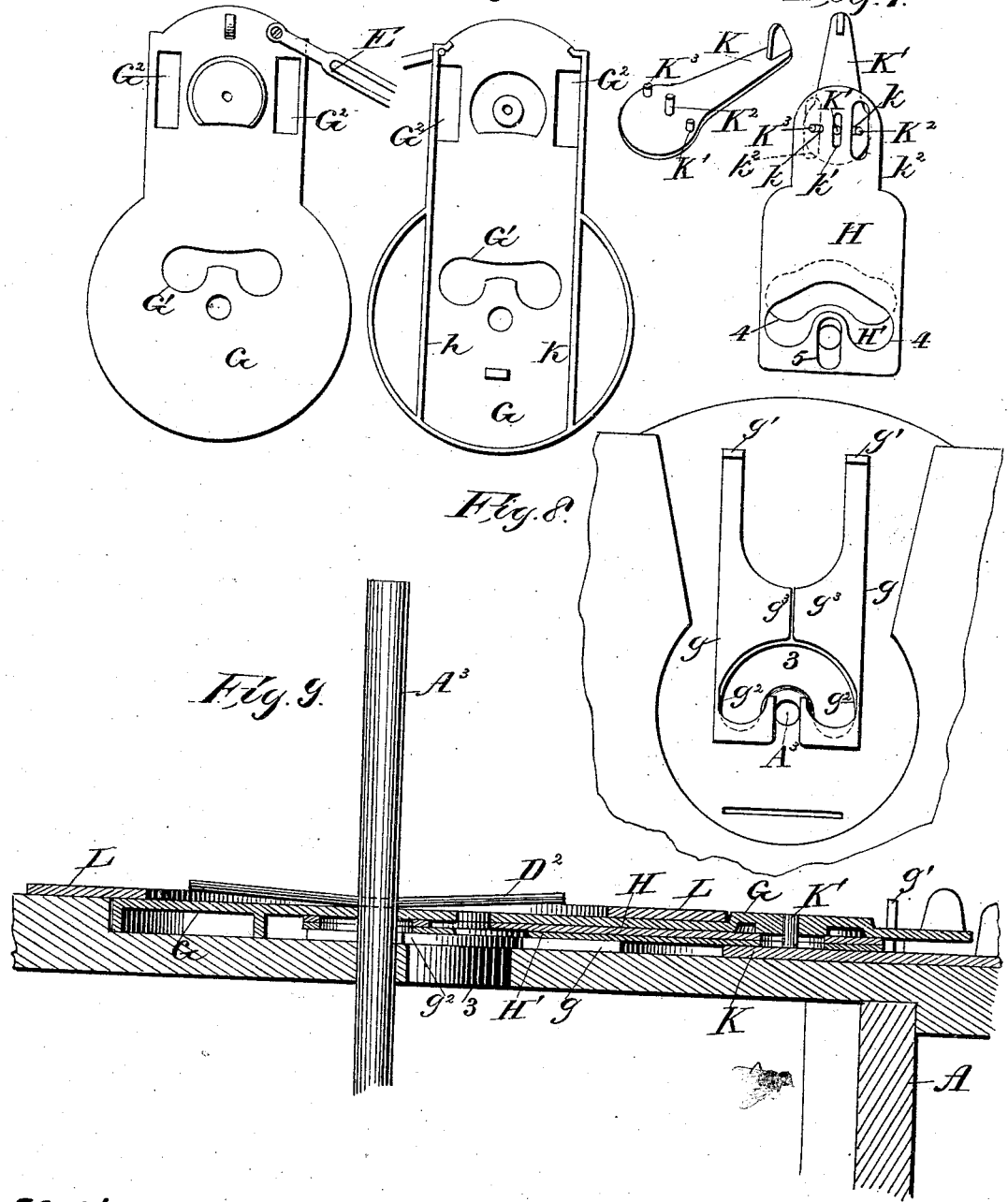

HENRY J. FOSTER, OF RACINE, WISCONSIN.

SEED-SOWER.

SPECIFICATION forming part of Letters Patent No. 321,703, dated July 7, 1885.

Application filed February 16, 1885. (No model.)

*To all whom it may concern:*

Be it known that I, HENRY J. FOSTER, of Racine, in the county of Racine, and in the State of Wisconsin, have invented certain new and useful Improvements in Seed-Sowers; and I do hereby declare that the following is a full, clear, and exact description thereof.

My invention relates to what are known as "broadcast-sowers," and will be fully described hereinafter.

In the drawings, Figure 1 is an end view of my improved sower with the hopper shown in section. Fig. 2 is a plan view of the same with the hopper removed. Fig. 3 is a section on line $x\,x$ on Fig. 2. Fig. 4 is a plan view of the distributer, with the floor of the sower shown in dotted lines. Figs. 5 to 8, inclusive, are details, and Fig. 9 is a section through the bottom of my sower, similar to that in Fig. 3, but exaggerated.

A is the frame of my sower, which is designed for attachment to a wagon. B is a driving-shaft that carries a sprocket-wheel, B', by which it is belted to a sprocket-wheel on one of the hind wheels of the wagon. This wheel B' is free on the shaft B, and slides loosely on it, and is provided with collar $b$ on one side, and clutch-teeth $b'$ on its other side, the latter to engage with corresponding lugs on a fixed collar, $a$, to throw the sower into gear, and the former to receive a grooved spanner, $c$, by which the wheel is moved in and out of gear with the clutch-collar $a$. A bar, C, extends from the spanner $c$ to a lever, C', that extends out at right angles from the lower end of an upright shaft, $C^2$, that is journaled to the frame, and a bracket, A', that supports the outer end of shaft B, and from the upper end of shaft $C^2$ another lever, $C^3$, extends out at right angles to it. This last-named lever is pivoted to the shaft $C^2$, and projects over a quadrant, $a'$, which is notched to receive it.

The inner end of shaft B is journaled in a bracket, $A^2$, and carries double bevel gear-wheel D, as shown in Figs. 1 and 3. The bracket $A^2$ also forms a step for an upright shaft, $A^3$, that carries the distributer D' as well as the stirring-pin $D^2$. The hub $d$ of the distributer D' turns loosely on the shaft $A^3$, and is formed with a bevel-pinion, $f$, that meshes with the teeth 1 on wheel D, and beneath this pinion $f$, and independent of it, another bevel-pinion, $f'$, is keyed on shaft $A^3$ to engage with the teeth 2 on wheel D. Consequently the stirring-pin and distributer are turned independently of each other and at different rates of speed.

The exit-opening 3 in the floor of the sower has the contour indicated by dotted lines in Fig. 4. On its upper side the floor is recessed, as shown, to receive a casting, G, which forms a housing for the plates, and the slides for regulating the quantity and direction of the flow of seed through its central opening, G', to the distributer. The slides $g\,g$ lie flat upon the floor of the sower, as shown in Fig. 8, and are formed with recesses $g^2$, which, when they lie together, as in Fig. 8, form an opening that conforms to the contour of the seed-opening 3 through the bottom of the sower; but when either one is pushed in under the housing as far as it will go its solid portion $g^3$ between the recess $g^2$ and thumb-piece $g'$ will completely cover one-half of the opening 3, as shown in dotted lines, Fig. 2, or they may both be thrust in together to entirely close the opening and shut off the flow of grain. The outer end of each of the plates $g\,g$ is provided with a thumb-piece, $g'$, that passes up through slots $G^2$ provided for it in the casting. The casting G is provided with ribs $h$, that form guides for the slides $g\,g$, as well as for plates H H', that rest upon the slides $g\,g$. These plates H H' have recesses 4 4 in one end, that also conform in general contour to the exit 3 of the sower-floor and the opening in plates $g\,g$, and in their outer end are slotted, as at $k$, $k'$, and $k^2$, to receive pins that project up from a lever, K, the center-pin K' of which projects up through the casting G, which forms a fulcrum upon which the lever turns to slide the plates in and out, and thus regulate the flow of seed through the casting by increasing or diminishing the size of the orifice.

The plates H H' differ from each other only in the contour and position of slots 4, the slot 4 in plate H being nearer to its inner end than the slot 4 in plate H' is to its inner end, and, while the front edge of slot 4 in plate H is an ellipsoidal concave, the rear edge of slot 4 in plate H' is an ellipsoidal convex, so that, when these two edges are made to approach, by shoving in plate H and drawing out plate H' the opening between them will be narrowed without changing its contour. Beside the slots 4, the plates H H' are each slotted, as at 5, in the inner end, to receive the shaft $A^3$.

When the plates H H' are in position, the plate H lies upon plate H', and the slot $k^2$ of one lies over the slot $k$ of the other, and pin $K^2$ passes up through slot $k$ of the bottom plate and slot $k^2$ of the top plate, and another pin, $K^3$, passes up through the slot $k^2$ of the bottom plate and the slot $k$ of the top plate, so that when the handle of lever K is turned its pins will thrust upon one plate and draw upon the other, and thereby the size of the opening 4 will be increased or diminished, the center of the opening 4 remaining always the same distance from the shaft $A^3$.

The casting G has a limited play in its seat, and is held in place by an annulus, L, that is secured to the bottom of the sower, and projects over it, as well as by the shaft $A^3$, which latter forms an axis for it. The opening in the floor of the sower is much larger than those in the casting, plate, and slide, and therefore by pivoting the casting I enable the operator to guide the seed down through the center of the opening or to either side of it; and this is further accomplished by closing either one of the slides $g\ g$. Thus I not only regulate the quantity of seed or fertilizer that is fed to the distributer, but determine the point at which it shall fall on the distributer.

The casting may be locked in any desired adjustment by means of a slotted strap, E, and set bolt and nut F.

Having thus fully described my invention, what I claim as new, and desire to secure by Letters Patent, is—

1. In a seed-sower, a casting forming the bottom of the hopper and having a seed-opening that leads to the distributer, in combination with a confining annulus that allows it a limited horizontal play on an arc of a circle, as set forth.

2. The combination, with the casting G, of the slotted slides H H', one sliding upon the other, and a lever having projecting pins passing through said slots for adjusting the slides with relation to each other, as set forth.

3. The combination, with the casting G, having guiding-ribs $h\ h$, of the slides H H', sliding one upon the other between said ribs and lever K, as set forth.

4. In a sower, the casting G and plates H H', in combination with the sectional and independently-adjustable slides $g\ g$, as set forth.

5. The casting having seed-opening adjacent to the center and adapted for adjustment on an arc of a circle, in combination with a device for securing said casting in the required adjustment, as set forth.

6. The shaft $A^3$, bevel-pinion fixed thereon, distributer and bevel-pinion carried thereby and turning loosely thereon, in combination with a stirring-pin, double bevel-wheel, and the driving-shaft, as set forth.

In testimony that I claim the foregoing I have hereunto set my hand, at Milwaukee, in the county of Milwaukee and State of Wisconsin, in the presence of two witnesses.

HENRY J. FOSTER.

Witnesses:
S. S. STOUT,
H. G. UNDERWOOD.